United States Patent [19]

Barbay

[11] 3,942,705

[45] Mar. 9, 1976

[54] PROTECTION FOR ALUMINUM TUBING DURING ULTRASONIC SOLDERING

[75] Inventor: Michael R. Barbay, Tyler, Tex.

[73] Assignee: General Electric Company, Louisville, Ky.

[22] Filed: Nov. 11, 1974

[21] Appl. No.: 522,332

[52] U.S. Cl. ............... 228/111; 228/262; 427/57; 427/329; 427/433; 427/287
[51] Int. Cl.² ........................................ B23K 1/06
[58] Field of Search ......... 117/DIG. 8; 427/433, 57, 427/431; 228/262, 110, 111, 18; 156/5, 21, 22; 134/1

[56] References Cited
UNITED STATES PATENTS

| | | | |
|---|---|---|---|
| 2,981,610 | 4/1961 | Snyder et al. | 134/1 UX |
| 3,411,999 | 11/1968 | Weinberg | 156/5 |
| 3,752,381 | 8/1973 | Watson | 427/57 |
| 3,767,491 | 10/1973 | Chough | 156/21 X |
| 3,831,263 | 8/1974 | Dzierski | 228/262 X |

*Primary Examiner*—Ralph S. Kendall

[57] ABSTRACT

The method of preventing surface erosion of a preselected portion of aluminum tubing during the ultrasonic soldering of a joint in another portion of the tubing. The preselected portion of tubing to be protected is coated prior to its being subjected to the ultrasonic soldering step so that the solder and its deoxidation action does not contact the aluminum surface of the preselected portion of the tube.

3 Claims, 1 Drawing Figure

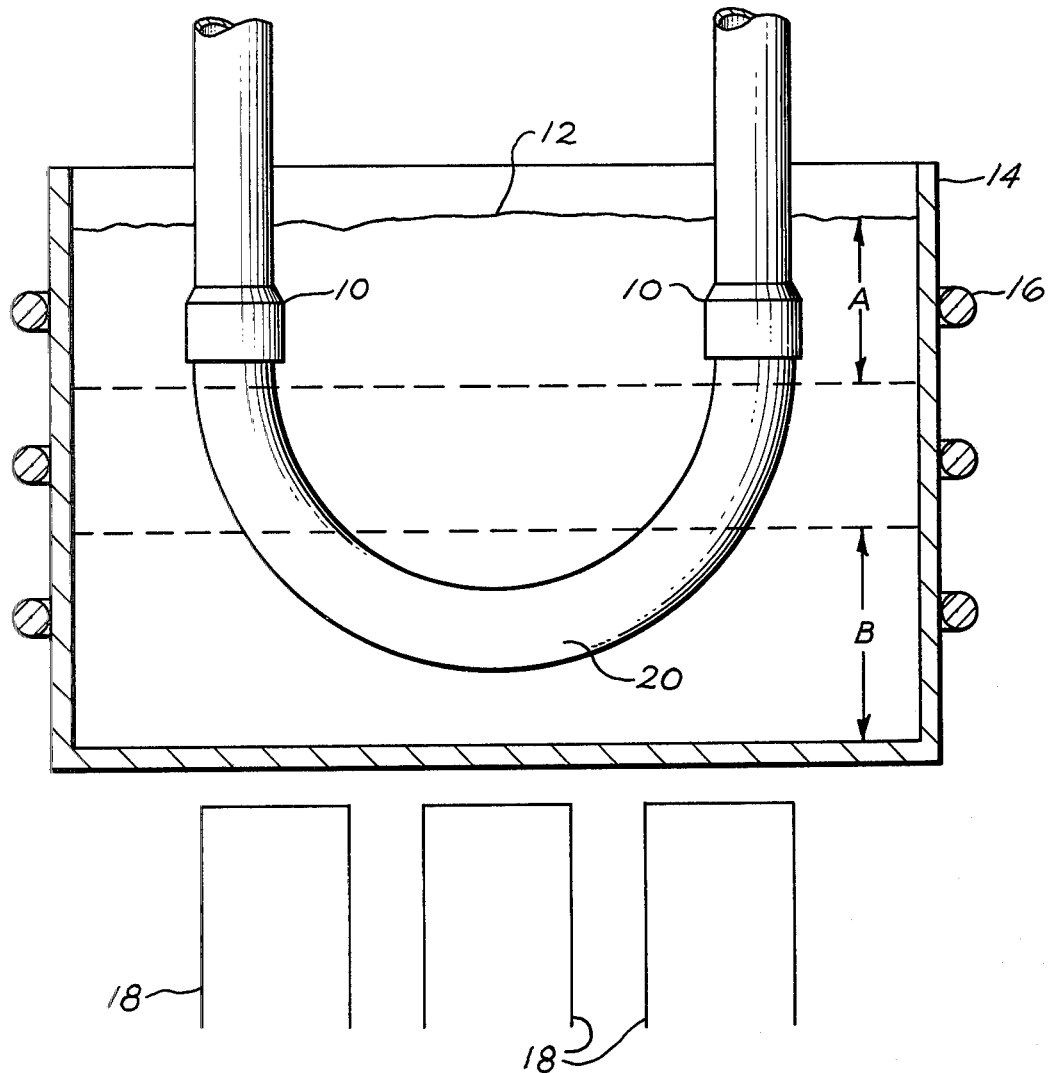

PROTECTION FOR ALUMINUM TUBING DURING ULTRASONIC SOLDERING

BACKGROUND OF THE INVENTION

In the process of ultrasonically soldering aluminum tube joints that are a part of an assembly the joints including adjacent portions of the assembly are immersed in a pot of molten solder while being exposed to ultrasonic energy generated by a plurality of transducers spaced on the outer surface of the pot.

The cavitation caused by the ultrasonic energy is effective in breaking and removing the oxide coating from the aluminum surface in the joint area so that the solder adheres to the aluminum surfaces and forms a seal. The location of the joint area relative to the level of the solder is carefully selected so as to effectively remove the oxide without causing damage to the tubing.

Generally the areas of the molten solder that are closer to the transducers or source of energy are subjected to higher energy and greater cavitation.

In many instances such as in soldering joints wherein the joint is part of an assembly, other parts of the assembly may be located by necessity closer to the energy source. When so located, they are, as a result, subjected to greater cavitation of the solder than the joint area. In some instances, the cavitation of the solder may be great enough to cause sufficient surface erosion to weaken the tubing and cause rupturing of the tubes under certain pressure conditions.

SUMMARY OF THE INVENTION

According to the present invention, there is provided a method of soldering a joint of an aluminum tubing assembly immersed in a molten solder bath that is subjected to ultrasonic energy. The joint area is in a preselected area of energy in the solder bath that is sufficient to cause the scrubbing away of oxide and the soldering of the joint. Portions of the assembly that are located sufficiently close to the ultrasonic energy source as to result in surface erosion during the soldering process are protected, in accordance with this invention by a coating applied prior to immersing the tubing assembly in the ultrasonic solder bath.

DESCRIPTION OF THE DRAWING

The drawing is a schematic elevational view in section illustrating an ultrasonic soldering pot employed in carrying out present method.

DESCRIPTION OF THE PREFERRED EMBODIMENT

In the fabrication of aluminum tube joints 10 employing solder as the sealing medium, it has been known to employ a process in which the parts to be joined are immersed in a molten solder bath 12 while being exposed to ultrasonic energy.

The solder bath is contained in a pot 14 which may have associated therewith appropriate heater elements 16 to maintain the solder at its proper consistency. In order for the surface of the aluminum parts to be joined in a tight seal, they first must be capable of becoming completely wetted by the solder which requires that the oxide be completely removed from the surface to be joined.

One well known method of removing the oxide from the surfaces to be soldered is to transmit to the solder an amount of ultrasonic energy sufficient to create a level of cavitation of the solder that will scrub the oxide from the surface of the tubes. The source of ultrasonic energy may be electrically energized transducers shown schematically at 18 juxtaposed along the outer surface of the bottom wall of pot 14.

It should be noted that the cavitation activity of the solder or energy level becomes or is greater as the source of energy 18 is approached. The area indicated at A in the drawings is a preselected level in the energy range that produces the desired result in the joint area. The cavitation of the solder at the level of joint 10 or area A is sufficient to remove the oxide and thoroughly wet the surface of the parts to be joined. As shown in the drawing with the joint to be soldered in the preselected desired area A, the portion of the assembly such as the lower end of the bend 20 may be in an extremely undesirable area of cavitation B. The cavitation activity in area B may be great enough that the scrubbing action of the solder on the surface of the aluminum tube is sufficient to cause surface erosion and a weakening of the side wall of the tube in that area.

In accordance with carrying out the method of the present invention, a protective coating is applied to the surface of the tubing that may be subjected to damaging cavitation of the solder as for example the portion of tubing 20 that may be located in the area B. The coating applied to the tubing preferably should be non-wetting with regard to the solder used; e.g., the coating should not be of the type that would become wetted during immersion, which would cause solder to adhere to it. While other material may be affected in preventing erosion, in the present embodiment, the tube portion to be protected from excessive cavitation was coated with a thin layer of tin plating of approximately 2 to about $6 \times 10^{-5}$ inches.

In the preferred tin plating, the portion to be protected can be cleaned of oxide by acid washing. An example, aqueous solution is a 10–20 percent by volume concentration of concentrated nitric acid. Thinner tin platings are undesirable because the resulting protective coating is too easily damaged during handling operation prior to soldering, and a thicker coating is not necessary for the protection of the part. The acid can be rinsed from the surface to be plated with water. The cleaned portion is then immersed in a tin-plating solution under conditions sufficient to fix a tin-plating covering over the portion to be protected from the cavitation of the solder during the joining process.

An example of immersion tin-plating processing material is, for example, one manufactured under the trademark "Alstar" by M & T Chemicals, Inc., Rahway, New Jersey. Other immersion tin-plating materials and processes are available and are known in the art.

While there has been shown and described a specific embodiment of the invention, it will be understood that it is not limited thereto and it is intended by the appended claims to cover all such modifications as fall within the true spirit and scope of the invention.

What is claimed is:

1. The method of soldering a joint of an aluminum tubing assembly in a molten solder bath that is subjected to ultrasonic energy source comprising:

immersing the tubing assembly in said bath so that said joint is in an area having a preselected level of solder cavitation sufficient to scrub surface oxide from said joint to cause the solder to adhere to said surface to seal said joint before surface erosion of said surface takes place;

coating a portion of said tubing assembly prior to said immersing of the tube assembly with a layer of tin plating so that the surface area of said portion when in an area having a greater level of solder cavitation than said preselected level is protected from erosion damage in said area having a greater level of solder cavitation during the scrubbing and soldering of said joint in said preselected level.

2. A method, as set forth in claim 1, wherein the coated portion of said tubing assembly when in said area of greater solder cavitation is closer to said ultrasonic energy source.

3. A method as set forth in claim 2 wherein the coating is tin plate having a thickness of between 2 to 6 × $10^{-5}$ inches.

* * * * *